United States Patent
Chen et al.

(10) Patent No.: US 9,892,552 B2
(45) Date of Patent: Feb. 13, 2018

(54) METHOD AND APPARATUS FOR CREATING 3-DIMENSIONAL MODEL USING VOLUMETRIC CLOSEST POINT APPROACH

(71) Applicant: Samsung Electronics Co., Ltd., Suwon-si, Gyeonggi-do (KR)

(72) Inventors: George Q. Chen, Mountain View, CA (US); Frank Brill, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/970,142

(22) Filed: Dec. 15, 2015

(65) Prior Publication Data
US 2017/0169603 A1    Jun. 15, 2017

(51) Int. Cl.
*G06T 17/00*    (2006.01)
*G06T 3/20*    (2006.01)
(Continued)

(52) U.S. Cl.
CPC .............. *G06T 17/00* (2013.01); *G06T 3/20* (2013.01); *G06T 3/60* (2013.01); *G06T 7/0065* (2013.01); *G06T 15/205* (2013.01); *H04N 1/00827* (2013.01); *G06T 2207/10024* (2013.01); *G06T 2207/10028* (2013.01); *G06T 2207/30244* (2013.01)

(58) Field of Classification Search
CPC ................................................. H04N 1/00827
See application file for complete search history.

(56) References Cited

U.S. PATENT DOCUMENTS

2013/0156297 A1    6/2013    Shotton et al.
2014/0146057 A1    5/2014    Kim et al.
(Continued)

FOREIGN PATENT DOCUMENTS

WO    WO2015/017941 A1    2/2015

OTHER PUBLICATIONS

A Volumetric Method for Building Complex Models from Range Images; by Brian Curless and Marc Levoy Stanford University ; Computer Science Department, Stanford University, Stanford, CA 94305 1996—10 Pages.
(Continued)

*Primary Examiner* — Thomas Lett

(57) ABSTRACT

A method for 3-Dimensional scanning includes generating a plurality of depth images when a depth sensor rotates around an object. The method further includes, for each depth image: estimating a rotation (R) and a translation (T) for each depth image, using data of a Truncated Signed Distance Function (TSDF) volume; and fusing each depth image accumulatively into the TSDF volume based on the estimated R and T. An apparatus for 3-Dimensional scanning includes a depth sensor configured to generate a plurality of depth images when rotating around an object. The apparatus further includes a processor configured to, for each depth image: estimate a rotation (R) and a translation (T) for each depth image, using data of a Truncated Signed Distance Function (TSDF) volume; and fuse each depth image accumulatively into the TSDF volume based on the estimated R and T.

23 Claims, 5 Drawing Sheets

(51) Int. Cl.
  G06T 3/60    (2006.01)
  G06T 7/00    (2017.01)
  H04N 1/00    (2006.01)
  G06T 15/20   (2011.01)

(56) References Cited

U.S. PATENT DOCUMENTS

| | | | |
|---|---|---|---|
| 2015/0109415 A1 | 4/2015 | Son et al. | |
| 2015/0145957 A1* | 5/2015 | Son | H04N 1/00827 348/46 |
| 2015/0178908 A1 | 6/2015 | Jesenko et al. | |
| 2016/0189419 A1* | 6/2016 | Fakih | G06T 7/0065 345/419 |

OTHER PUBLICATIONS

Richard A. Newcombe et al.; "KinectFusion: Real-Time Dense Surface Mapping and Tracking"; Mixed and augmented reality (ISMAR) 2011; 10th IEEE international Symposium;—10 Pages.

"Using Kinfu Large Scale to generate a textured mesh"; Point Cloud Library (PCL); http://pointclouds.org/documentation/tutorials/using_kinfu_large_scale.php—[Dec. 15, 2015 3:01:15 PM]—9 pages.

"Volumetric Stereo/Voxel Coloring"; http://image.slidesharecdn.com/...conversion-gate02/95/visual-slam-structure-from-motion-multiple-view-stereo-51-638.jpg?cb=1442333945[Dec. 15, 2015]—1 Page.

Voxel Map Construction and Rendering—Introduction to Simultaneous Localization and Mapping (SLAM) with RGB-D; http://octreeslam.blogspot.com/2014_12_01—Dec. 15, 2015—6 Pages.

Bylow, E., et al., "Real-Time Camera Tracking and 3D Reconstruction Using Signed Distance Functions," Robotics: Science and Systems (RSS), Online Proceedings, vol. 9, 2013, 8 pages.

Whelan, T., et al., "Real-Time Large-Scale Dense RGB-D SLAM with Volumetric Fusion," International Journal of Robotics Reseach, vol. 34, No. 4-5, http://hdl.handle.net/1721.1/97583, Apr. 1, 2015, pp. 598-626.

Foreign Communication From a Related Counterpart Application, PCT Application No. PCT/KR2016/013280, International Search Report and Written Opinion dated Feb. 15, 2017, 11 pages.

* cited by examiner

METHOD AND APPARATUS FOR CREATING 3-DIMENSIONAL MODEL USING VOLUMETRIC CLOSEST POINT APPROACH

TECHNICAL FIELD

The present application relates generally to 3D scanning using a volumetric approach, and, more specifically, to a method and apparatus for creating 3-dimensional model using volumetric closest point approach.

BACKGROUND

3-Dimensional scanning is an area of great concern in such fields as 3D virtual reality, robotics or 3D printer, etc. Among various methods of 3D scanning, a technique of using distance information obtained from a depth camera provides excellent performance and is widely used in 3D scanners.

SUMMARY

The present disclosure provides a novel and efficient way to combine the information from several depth-camera images to create a full representation of an object or environment. It is more efficient and robust than previous approaches, therefore more useful on resource-constrained mobile devices for consumers that have to work in unconstrained environments. Potential applications are 3D scanning of objects and automatic mapping of buildings and terrain.

In a first embodiment, a method for 3-Dimensional scanning is provided. The method includes generating a plurality of depth images when one of a depth sensor and an object rotates with respect to the other. The method further includes, for each depth image: estimating a rotation (R) and a translation (T) for each depth image, using data of a Truncated Signed Distance Function (TSDF) volume; and fusing each depth image accumulatively into the TSDF volume based on the estimated R and T.

In a second embodiment, an apparatus for 3-Dimensional scanning is provided. The apparatus includes a depth sensor configured to generate a plurality of depth images when one of the apparatus and an object rotates with respect to the other. The apparatus further includes a processor configured to, for each depth image: estimate a rotation (R) and a translation (T) for each depth image, using data of a Truncated Signed Distance Function (TSDF) volume; and fuse each depth image accumulatively into the TSDF volume based on the estimated R and T.

A non-transitory computer readable medium comprising program code, that when executed by at least one processor, causes the at least one processor to generate a plurality of depth images when one of a depth sensor and an object rotates with respect to the other, and for each depth image estimate a rotation (R) and a translation (T) for each depth image, using data of a Truncated Signed Distance Function (TSDF) volume, and fuse each depth image accumulatively into the TSDF volume based on the estimated R and T.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "controller" means any device, system or part thereof that controls at least one operation, such a device may be implemented in hardware, firmware or software, or some combination of at least two of the same. It should be noted that the functionality associated with any particular controller or processor may be centralized or distributed, whether locally or remotely. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication unless explicitly specified. The terms "include" and "comprise," as well as derivatives thereof, mean inclusion without limitation. The term "or" is inclusive, meaning "and/or." The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical signals or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged 3 Dimensional scanning.

Figure 1:
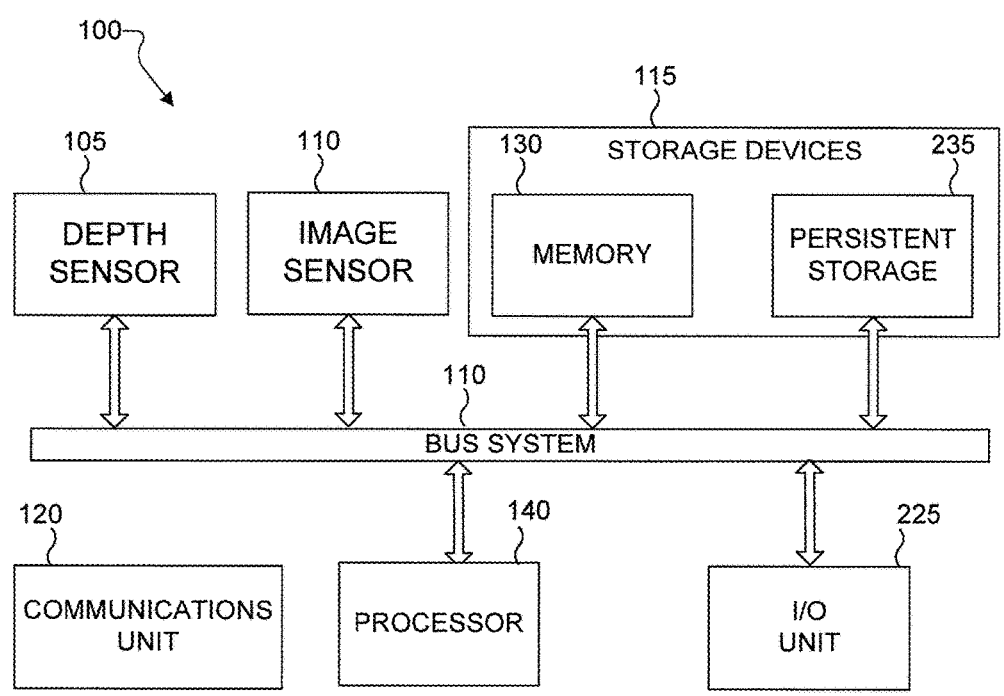
FIG. 1 illustrates a high level block diagram of 3D scanning system according to one embodiment of the present disclosure.

FIG. 1 illustrates a high level block diagram of 3D scanning system 100 according to one embodiment of the present disclosure. The embodiment of 3D scanning system 100 shown in FIG. 1 is for illustration only. Other embodiments could be used without departing from the scope of the present disclosure.

The 3D scanning system 100 includes the depth sensor 105. The depth sensor 105 is configured to generate depth map from physical surrounding. The depth sensor 105 can include a light illuminator and an image sensor. The light illuminator can project light having known patterns such as a grid pattern on the scene. The image sensor is sensitive to both color and the wavelength of the illuminant, and is used to collect color and light reflected from a target. The image sensor includes a color image sensor.

A depth sensor 105 can be attached to a mobile device. In some embodiments, the 3D scanning system 100 may be implemented in a mobile device and a depth sensor 105 can be built into the mobile device, or can be plugged into the mobile device. The mobile device may be a "smart" phone, tablet, laptop computer or other portable device capable of wireless or wire communications.

The processor 140 is configured to execute instructions that can be loaded into a memory 130. Example processor 140 can include microprocessors, microcontrollers, digital signal processors, field programmable gate arrays, application specific integrated circuits, and discrete circuitry. The processor 140 can be configured to execute processes and programs resident in the memory 230, such as operations for 3-Dimensional scanning.

The memory 130 and a persistent storage 135 are examples of storage devices 115, which represent any structure(s) capable of storing and facilitating retrieval of information such as the depth images. The memory 130 can represent a random access memory or any other suitable volatile or non-volatile storage device(s). The persistent storage 135 can contain one or more components or devices supporting longer-term storage of data, such as a ready only memory, hard drive, flash memory, or optical disc.

The communications unit 120 is configured to support communications with other systems or devices. For example, the communications unit 120 can include a network interface card or a wireless transceiver facilitating communications over the network. The communications unit 120 can be configured to support communications through any suitable physical or wireless communication link(s).

The I/O unit 125 is configured to allow for input and output of data. For example, the I/O unit 125 can be configured to provide a connection for user input through a keyboard, mouse, keypad, touchscreen, or other suitable input device. The I/O unit 125 can also be configured to send output to a display, printer, or other suitable output device.

The display 150 is configured to provide real-time feedback to user indicative of the 3D data that has been captured from a scene.

Figure 2:
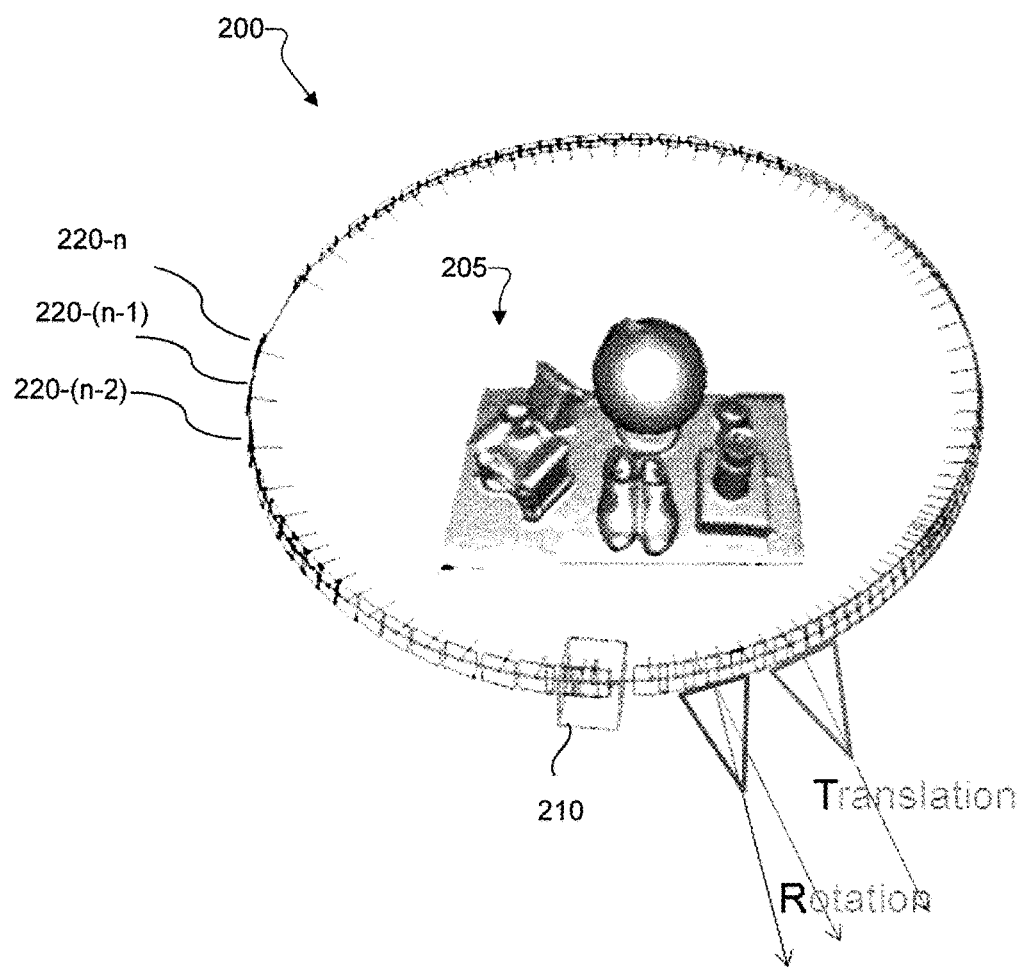
FIG. 2 illustrates in-bound scanning according to one embodiment of the present disclosure.

FIG. 2 illustrates in-bound scanning 200 according to one embodiment of the present disclosure. The embodiment of in-bounding scanning 200 shown in FIG. 2 is for illustration only. Other embodiments could be used without departing from the scope of the present disclosure.

A mobile device 210 is equipped with a depth sensor. For example, the mobile device 210 may be one embodiment of the 3D scanning system 100. While the mobile device 210 moves around the target objects 205, the depth sensor produces depth maps for images (i.e., depth images) captured by the camera. A 3D model of the object is feedback to the user and shown on the device. In one embodiment, the mobile device 210 scans the target objects 205 spinning around itself. When a 360-degree scan is complete, a 3D model of the object is computed.

The depth sensor can record N depth image frames 220-1, 220-2, . . . 220-n periodically, such as every second or a frame every ½ second. These N depth image frames are fused together based on the difference between translation (T) and rotation (R) or the depth sensor pose along- and around the x, y and z axis in the current frame and previous frame. The translation (T) can indicate the distance between frames and the rotation (R) can indicate an angular position with respect to an object.

The resulting depth maps are fused sequentially into a volumetric 3D representation which stores the Truncated Signed Distance Function (TSDF). After all depth maps have been fused, a 3D point cloud or mesh can be generated from the volume data. In order to carry out the fusion, the camera pose of each frame is estimated as described later in the present disclosure.

Figure 3:
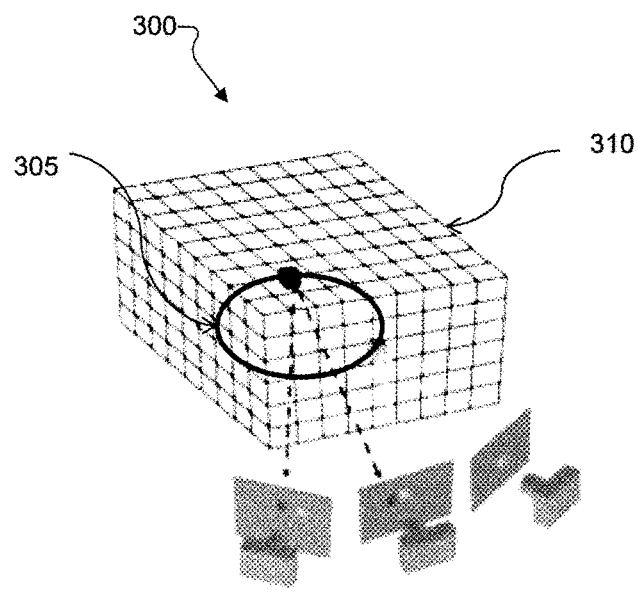
FIG. 3 illustrates object volumetric representation according to one embodiment of the present disclosure.

FIG. 3 illustrates object volumetric representation 300 according to one embodiment of the present disclosure. The embodiment of object volumetric representation 300 shown in FIG. 3 is for illustration only. Other embodiments could be used without departing from the scope of the present disclosure.

Conceptualizing a target object 305 embedded inside a 3D grid, each 3D grid stores a floating point value, which is called Truncated Signed Distance Function (TSDF). The 3D grid filled with TSDF values is called the TSDF volume 305. The value of TSDF represents a distance of grid location to the target object surface. TSDF encodes both the distance and siding of the grid point to the object surface.

The TSDF volume stores higher quality data than any input because it stores all data up-to-date, and because noise is filtered out in the process.

Figure 4:
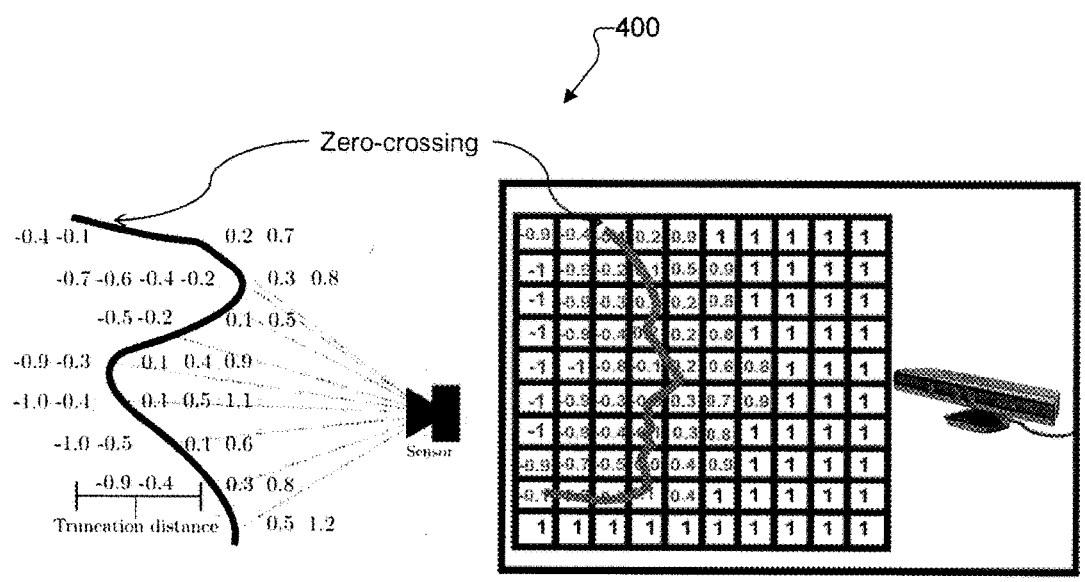
FIG. 4 illustrates a slice of TSDF volume according to one embodiment of the present disclosure.

FIG. 4 illustrates one slice 400 of the TSDF volume according to one embodiment of the present disclosure. The embodiment of the slice of the TSDF volume shown in FIG. 4 is for illustration only. Other embodiments could be used without departing from the scope of the present disclosure.

Each slice of TSDF volume is filled with TSDF values. If a sign of TSDF is positive, the grid locates outside the target object. If a sign of TSDF is negative, the grid locates inside the target object. For example, +1 means 1 millimeter (mm) outside away from the face, −1 means 1 mm inside away from the face surface.

A line of zero-crossing thus encodes the object surface which is interpolated to achieve sub-grid accuracy. In other words, Zero-crossing is the location of the object surface.

Figure 5A:
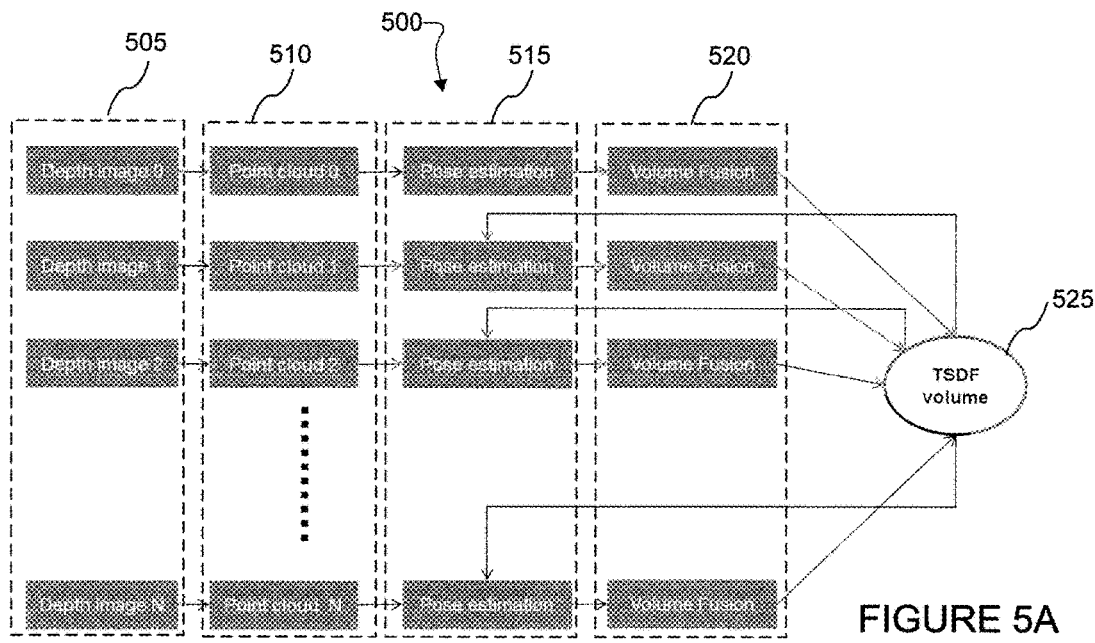
FIGS. 5A and 5B illustrate flowcharts for 3D scanning operation according to one embodiment of the present disclosure.
Figure 5B:
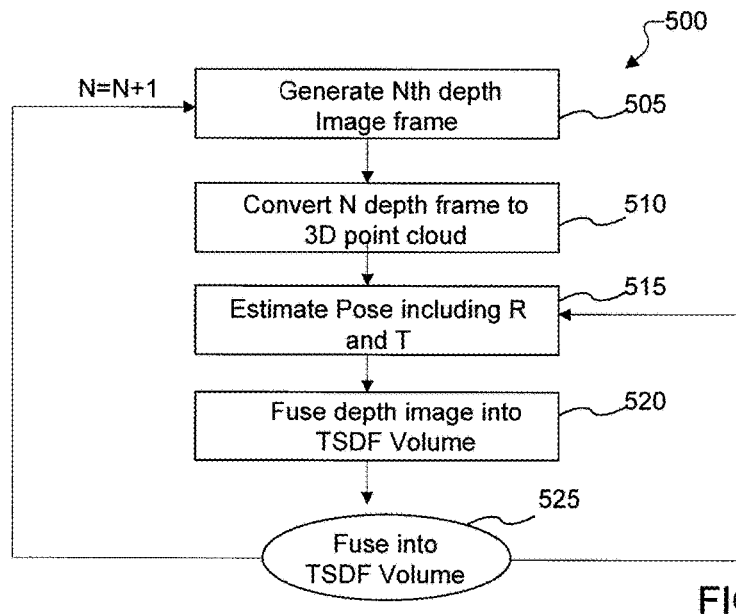

FIGS. 5A and 5B illustrate flowcharts 500, 501 for 3D scanning operation according to one embodiment of the present disclosure. The embodiment of 3D scanning operation shown in FIGS. 5A and 5B are for illustration only. Other embodiments could be used without departing from the scope of the present disclosure.

At step 505, the depth sensor generates N depth image frames periodically. These N depth image frames are converted to 3D point clouds at step 510.

In order to fuse an incoming depth map, its sensor pose including rotation R and translation T with respect to the volume is firstly estimated at step 515. Each converted depth image frame is fused into TSDF volume 525 based on the estimated depth sensor pose including translation T and rotation R at step 520.

Volume Fusion is the process of sequentially fusing multiple input depth maps into the aforementioned volumetric representation. There are at least three pose estimation technologies for volume fusion:

Iterative Closest Point (ICP). In order to fuse the new data N resulted from the incoming depth map to the already-fused data M, for each point in N, ICP searches for the closest point in M and uses the set of point pairs to compute the pose. To accelerate the search, a K-Dimensional (KD) Tree is constructed from M. Then, after N is fused with M, a new KDTree is constructed for the updated M before fusing the next depth map.

Volumetric Gradient Descent. This technology also uses the volumetric representation. It solves the pose estimation problem by minimizing $f(P(N))$ where $f$ is the volume function and P is the pose to be computed.

Structure-from-Motion (SfM). This approach is used when the color information is available in addition to depth, e.g. from RGB-D sensors. It first detects feature points in each color image, then finds the correspondences among these feature points across multiple images, and finally solves the camera poses of multiple sensors using non-linear optimization techniques.

Iterative Closest Point utilizes a KDTree to find the closest point of N. Volumetric Gradient Descent relies on the gradient of the volume function $f$ and does not involve the closest point at all. One embodiment of the present disclosure uses the gradient to compute the closest point. The embodiments of the present disclosure are distinguished from Iterative Closest Point, for example, in the sense that how the closest points are calculated. The embodiments of the present disclosure are distinguished from Volumetric Gradient Descent, for example, in the sense that how the gradient is actually used. Structure-from-Motion (SfM) requires the detection of enough number of feature points in the color images and the identification of the correspondences of these feature points. These requirements are avoided in depth-sensor based techniques in accordance with the present disclosure.

Pose estimation may be performed either using additional data structures or casting the problem into an optimization framework which is hard to implement with fixed-point math. One embodiment of the present disclosure uses the volume data for both pose estimation and depth map fusion. This has the advantage of being able to implement in fixed-point math without the help of special auxiliary data structures.

Figure 6:
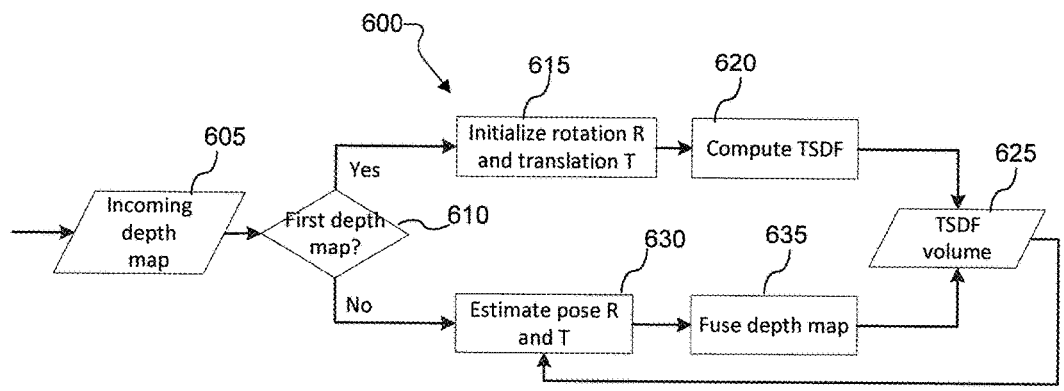
FIG. 6 illustrates the Volume Fusion operation for creating the TSDF volume according to one embodiment of the present disclosure.

FIG. 6 illustrates the volume fusion operation 600 for creating the TSDF volume 625 according to one embodiment of the present disclosure. The embodiment of the Volume Fusion operation 600 shown in FIG. 6 is for illustration only. Other embodiments could be used without departing from the scope of the present disclosure.

If an incoming depth map is the first depth map at steps 605 and 610, the pose for first depth sensor position is initialized to be an initial angular position of the depth sensor for the rotation R and zero for the translation T (R=identity, T=0) at step 615. For the $2^{nd}$ sensor position through the last depth sensor position, the rotations R and a translations T for each depth image are estimated using data of a Truncated Signed Distance Function (TSDF) volume at step 630 as described in detail below. The depth map is then fused into the TSDF volume 635.

Figure 7:
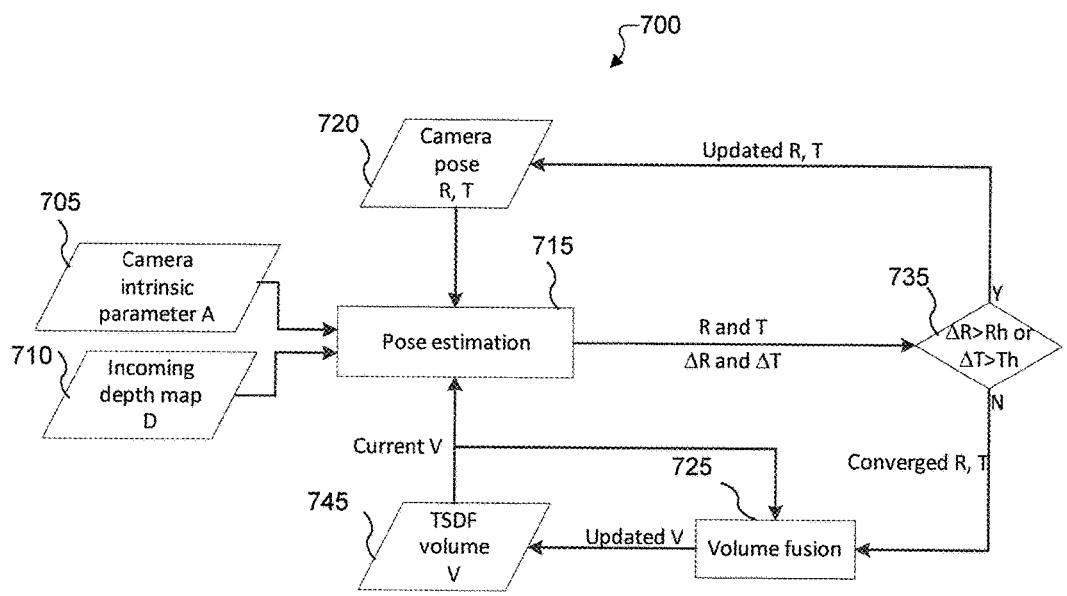
FIG. 7 illustrates the pose estimation operation according to one embodiment of the present disclosure.

FIG. 7 illustrates the pose estimation operation 700 according to one embodiment of the present disclosure. The embodiment of the pose estimation operation 700 shown in FIG. 7 is for illustration only. Other embodiments could be used without departing from the scope of the present disclosure.

The input of the pose estimation operation includes the current depth map (i.e., depth image) dn (step 710) and TDSF volume V filled with TSDF from $d_0, d_1, \ldots, d_{n-1}$ (step 745).

The output of the pose estimation operation is a pose of the n-th sensor position, which includes R for rotation and T for translation (step 715). The pose estimation operation is repeated to determine each pose of all around sensor positions (i.e., frames).

With the above input, the pose estimation begins with computing a 3D coordinate set N of a depth image from TSDF volume by using the following algorithm:

For each pixel (u,v) of dn:
  Retrieve depth d=dn (u,v);
  Compute 3D coordinate $n=A^{-1} (u,v,1)^T d$, where A is the sensor intrinsic matrix including focal lengths, and u and v are real numbers; and
  Insert n into N.

The next step is to initialize R and T. If another initialization method is available such as 2D tracking or ICP, set R and T accordingly. Otherwise, set $R=R_{n-1}$, $T=T_{n-1}$ (step 705).

Subsequently, the R and T for each sensor position is estimated by using the following algorithm:

Loop
  For each point n in N:

$p=Rn+T;$

If $|f(p)|<B$ and $\nabla f(p) \neq 0$
    Insert p into P;

$$q = p - f(p)\frac{\nabla f(p)}{|\nabla f(p)|}$$

where $f(p)$ is the TSDF at location p and $\nabla f(p)$ is the TSDF gradient at the same location; and
    Insert q into Q
  Pm=mean(P) and Qm=mean(Q)

$(U,W,V)=\text{SVD}((P-P_m)^T(Q-Q_m)),$ where SVD is single value decomposition which returns three matrices U,W,V, wherein W is a diagonal matrix, and U, V are decomposed matrices $\Delta R = VU^T, \Delta T = Q_m - RP_m$ $R = \Delta R \cdot R, T = \Delta R \cdot T + \Delta T$ Until $|\Delta R|$<angleThreshold and $|\Delta T|$<distanceThreshold, where the angleThreshold and distanceThreshold are real numbers (step 735).

Once translation T and rotation R satisfying respective thresholds are identified and then updated at step 720, each depth image frame is fused into TSDF volume 745 based on the translation T and rotation R at step 725.

The pose estimation in accordance with an embodiment of the present disclosure provides the following advantages:

First, stability—since depth data from all frames up to the current one are fused in the volume, compared to ICP, more information is available to the pose estimation process. Thus the process is more stable and robust to input noise.

Second, efficiency—the current disclosure is more efficient than ICP because a model point can be computed with only three multiplications and three subtractions, while ICP needs to construct the KDTree and perform a tree search. The current disclosure is more efficient than Volumetric Gradient Descent because it does not need to solve a group of non-linear equations composed from thousands of data points.

Third, generality—RGB-based approaches such as Structure-from-Motion rely on good lighting environment and textured object surfaces. Otherwise the feature detection will fail. Depth-based approaches such as ours do not have such limitations.

While each process flow and/or signal sequence depicted in the figures and described above depicts a sequence of steps and/or signals, either in series or in tandem, unless explicitly stated or otherwise self-evident (such as that a signal cannot be received before being transmitted) no inference should be drawn from that sequence regarding specific order of performance, performance of steps or portions or transmission of signals thereof serially rather than concurrently or in an overlapping manner, or performance the steps or transmission of signals depicted exclusively without the occurrence of intervening or intermediate steps or signals. Moreover, those skilled in the art will recognize that complete processes and signal sequences are not illustrated or described. Instead, for simplicity and clarity, only so much of the respective processes and signal sequences as is unique to this disclosure or necessary for an understanding of this disclosure is depicted and described.

Although this disclosure has been described with exemplary embodiments, various changes and modifications can be suggested to one skilled in the art. It is intended that this disclosure encompass such changes and modifications as fall within the scope of the appended claims.

What is claimed is:

1. A method for 3-Dimensional scanning, the method comprising:
   generating a plurality of depth images when one of a depth sensor and an object rotates with respect to each other; and
   for each depth image:
      estimating a rotation (R) and a translation (T) for each depth image, using data of a Truncated Signed Distance Function (TSDF) volume; and
      fusing each depth image accumulatively into the TSDF volume based on the estimated R and T.

2. A method for 3-Dimensional scanning, the method comprising:
   generating a plurality of depth images when an object rotates around a depth sensor; and
   for each depth image:
      estimating a rotation (R) and a translation (T) for each depth image, using data of a Truncated Signed Distance Function (TSDF) volume; and
      fusing each depth image accumulatively into the TSDF volume based on the estimated R and T.

3. The method of claim 1, further comprising when the depth image is a first-taken depth image, initializing R as an initial angular position of depth sensor with respect to the object and T as zero.

4. The method of claim 1, further comprising when the depth image is not a first-taken depth image, setting the R and T as a previous R and T of a previous depth image.

5. The method of claim 1, wherein estimating the R and T for each depth image comprises computing a 3D coordinate set N of each depth image from the TSDF volume.

6. The method of claim 5, wherein estimating the R and T for each depth sensor position comprises calculating an average of P and an average of Q, by using a following algorithm:
   for each point n in M
   $$p=Rn+T$$
   if $|f(p)|<B$ and $\nabla f(p) \neq 0$
   insert p into P $$q = p - f(p)\frac{\nabla f(p)}{|\nabla f(p)|}$$

where $f(p)$ is the Truncated Signed Distance Function (TSDF) at location p and $\nabla f(p)$ is the TSDF gradient at the same location, both calculated from the TDSF volume V
   insert q into Q
   $P_m$=mean(P) and $Q_m$=mean(Q).

7. The method of claim 3, wherein the 3D coordinate set N of the depth image is computed by using a following algorithm:
   for each pixel (u,v) of dn:
      retrieve depth d=dn (u,v);
      compute 3D coordinate m=$A^{-1}$ $(u,v,1)^T$ d; and
      insert n into N,
   wherein A is an intrinsic matrix including focal lengths, and wherein dn is a current n-th depth image, and u and v are real numbers.

8. The method of claim 6, further comprising calculating R and T by using a following algorithm:
   Loop
   $$(U,W,V)=SVD((P-P_m)^T(Q-Q_m)),$$
   where SVD is single value decomposition which returns three matrices U,W,V, wherein W is a diagonal matrix, and U,V are decomposed matrices;
   $$\Delta R=VU^T, \Delta T=Q_m-RP_m; \text{ and}$$
   $$R=\Delta R \cdot R, T=\Delta R \cdot T+\Delta T,$$
   Until $|\Delta R|$<angleThreshold and $|\Delta T|$<distanceThreshold, where the angleThreshold and distanceThreshold are real numbers.

9. The method of claim 1, wherein the depth sensor comprises a color sensor.

10. The method of claim 1, wherein the depth sensor is included in a mobile device.

11. The method of claim 1, wherein the depth sensor is attachable to a mobile device.

12. An apparatus comprising:
a depth sensor configured to generate a plurality of depth images when one of the apparatus and an object rotates with respect to the other; and
a processor configured to:
for each depth image:
estimate a rotation (R) and a translation (T) for each depth image, using data of a Truncated Signed Distance Function (TSDF) volume; and
fuse each depth image accumulatively into the TSDF volume based on the estimated R and T.

13. The apparatus of claim 11, wherein the processor is further configured to when the depth image is a first-taken depth image, initializing R as an initial angular position of depth sensor with respect to the object and T as zero.

14. The apparatus of claim 11, wherein the processor is further configured to when the depth image is not a first-taken depth image, set the R and T as a previous R and T of a previous depth image.

15. The apparatus of claim 11, wherein the processor is further configured to compute a 3D coordinate set N of each depth image from the TSDF volume.

16. The apparatus of claim 14, wherein the 3D coordinate set N of the depth image is computed by using a following algorithm:
for each pixel (u,v) of dn:
retrieve depth d=dn (u,v);
compute 3D coordinate $n=A^{-1}(u,v,1)^T d$; and
insert n into N,
wherein A is an intrinsic matrix including focal lengths, and wherein dn is a current n-th depth image, and u and v are real numbers.

17. The apparatus of claim 15, wherein the processor is further configured to calculate an average of P and an average of Q, by using a following algorithm:
for each point n in N:
$p=Rn+T$;
If $|f(p)|<B$ and $\nabla f(p) \neq 0$
Insert p into P; and $$q = p - f(p)\frac{\nabla f(p)}{|\nabla f(p)|}$$

where $f(p)$ is the Truncated Signed Distance Function (TSDF) at location p and $\nabla f(p)$ is the TSDF gradient at the same location, both calculated from the TDSF volume V,
Insert q into Q; and
$P_m$=mean(P) and $Q_m$=mean(Q).

18. The apparatus of claim 16, wherein the processor is further configured to calculate the R and T by using a following algorithm:
Loop $$(U,W,V)=SVD((P-P_m)^T(Q-Q_m)),$$

where SVD is single value decomposition which returns three matrices U,W,V, wherein W is a diagonal matrix, and U,V are decomposed matrices $$\Delta R=VU^T, \Delta T=Q_m-RP_m$$

$$R=\Delta R \cdot R, T=\Delta R \cdot T+\Delta T$$

Until $|\Delta R|<$angleThreshold and $|\Delta T|<$distanceThreshold, where the angleThreshold and distanceThreshold are real numbers.

19. The apparatus of claim 11, wherein the depth sensor comprises a color sensor.

20. The apparatus of claim 11, wherein the depth sensor is included in a mobile device.

21. The apparatus of claim 11, wherein the depth sensor is attachable to a mobile device.

22. A non-transitory computer readable medium comprising program code, that when executed by at least one processor, causes the at least one processor to:
generate a plurality of depth images when one of a depth sensor and an object rotates with respect to the other; and
for each depth image:
estimate a rotation (R) and a translation (T) for each depth image, using data of a Truncated Signed Distance Function (TSDF) volume; and
fuse each depth image accumulatively into the TSDF volume based on the estimated R and T.

23. The non-transitory computer readable medium of claim 22, wherein estimating the R and T for each depth image comprises computing a 3D coordinate set M of each depth image from the TSDF volume.

* * * * *